United States Patent
Yamaguchi

(10) Patent No.: US 6,521,976 B2
(45) Date of Patent: Feb. 18, 2003

(54) MULTILAYER LC COMPOSITE COMPONENT

(75) Inventor: Naoto Yamaguchi, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/942,499

(22) Filed: Aug. 30, 2001

(65) Prior Publication Data

US 2002/0048872 A1 Apr. 25, 2002

(30) Foreign Application Priority Data

Sep. 1, 2000 (JP) .......................................... 2000-265655

(51) Int. Cl.⁷ .............................................. H01L 23/58

(52) U.S. Cl. ..................... 257/635; 361/303; 361/306.1; 361/306.3; 361/312; 361/821

(58) Field of Search .............................. 361/303, 306.1, 361/306.3, 312; 333/185

(56) References Cited

U.S. PATENT DOCUMENTS 6,061,227 A * 5/2000 Nogi ........................... 333/185
6,115,234 A * 9/2000 Ishii et al. ................... 333/184

* cited by examiner

*Primary Examiner*—David Helms
*Assistant Examiner*—Mai-Huong Tran
(74) *Attorney, Agent, or Firm*—Keating & Bennett, LLP

(57) ABSTRACT

A multilayer LC composite component is constructed for allowing for free and easy setting of an attenuation pole formed at a frequency higher than the central frequency to adjust the frequency characteristics of the LC composite component. In the multilayer LC composite component, inductor via-holes are connected in the direction in which insulation layers are stacked to constitute first to third pillar inductors. In the axial directions of the first and third inductors, input and output lead patterns are electrically connected to midpoints of the first and third inductors. A distance between a ground pattern and each of positions at which the input and output lead patterns are electrically connected to the first and third inductors is shorter than the length of each of the first and third inductors.

19 Claims, 5 Drawing Sheets

MULTILAYER LC COMPOSITE COMPONENT

BACKGROUND OF THE INVENTION

1. Field of the Invention

The present invention relates to multilayer LC composite components, and more particularly, the present invention relates to multilayer LC composite components used in mobile communication apparatuses such as mobile phones and methods for adjusting the frequency characteristics of the multilayer LC composite components.

2. Description of the Related Art

A conventional multilayer LC composite component defining a multilayer LC filter is shown in FIG. 5. A multilayer LC composite component 1 in FIG. 5 includes ceramic sheets 2 to 9 having inductor via-holes 10a, 10b, 11a, 11b, 12a, and 12b formed therein, capacitor patterns 13 to 15, resonant capacitor patterns 16a, 16b, 17a, 17b, 18a, and 18b, coupling capacitor patterns 19 to 21, ground-side capacitor patterns 22 to 24, ground patterns 25 and 26, input and output lead patterns 27 and 28 disposed thereon.

The ceramic sheets 2 to 9 are stacked and a protecting ceramic sheet is disposed on the top and bottom of the stacked sheets. Then, the entire group of stacked sheets is integrally burned to constitute a multilayered body 50 shown in FIG. 6. An input terminal 51, an output terminal 52, and ground terminals G1 and G2 are disposed on the multilayered body 50. The input terminal 51 is connected to the input and output lead pattern 27, and the output terminal 52 is connected to the input and output lead pattern 28. The ground terminals G1 and G2 are connected to the ground patterns 25 and 26 and the ground-side capacitor patterns 22 to 24.

In the LC filter 1 having the above-described structure, the inductor via-holes 10a, 10b, 11a, 11b, 12a, and 12b are connected in the direction in which the ceramic sheets 2 to 9 are stacked to constitute pillar inductors L1, L2, and L3 having lengths d1. The resonant capacitor patterns 16a, 16b, 17a, 17b, 18a, and 18b are opposed to the ground pattern 25 and the ground-side capacitor patterns 22 to 24 via the ceramic sheets 2 to 4 to define resonant capacitors C1, C2, and C3. The capacitor patterns 13 to 15 are opposed to the coupling capacitor patterns 19 to 21 to define coupling capacitors Cs1, Cs2, and Cs3. In addition, connecting via-holes 41a to 41d, 42a to 42d, and 43a to 43d, are arranged to electrically connect the resonant capacitor patterns 16a, 16b, 17a, 17b, 18a, and 18b to the inductors L1, L2, and L3.

FIG. 7 is an electrically equivalent circuit diagram of the LC filter 1 constituted by the above-described arrangement. The pillar inductor L1 and the resonant capacitor C1 define an LC resonator Q1, the pillar inductor L2 and the resonant capacitor C2 define an LC resonator Q2, and the pillar inductor L3 and the resonant capacitor C3 define an LC resonator Q3. The LC resonators Q1 to Q3 are electrically connected to each other via the coupling capacitors Cs1 to Cs3 to constitute a three-stage band pass filter. Furthermore, mutual inductances M generated between the pillar inductors L1 to L3 and the coupling capacitors Cs1 to Cs3 define parallel traps to provide an attenuation pole at a frequency higher than the central frequency.

On the other hand, in the LC filter 1 having the above-described structure, one end of each of the inductors L1 to L3 is electrically connected to each of the capacitor patterns 13 to 15 to define the open-circuited end of each of the resonators Q1 to Q3. The other ends of the inductors L1 to L3 are electrically connected to the ground pattern 26 to define the short-circuited ends of the resonators Q1 to Q3. In addition, the input and output lead patterns 27 and 28 are always led from one end of each of the pillar inductors L1 and L3, that is, from the open-circuited ends of the resonators Q1 and Q3. As a result, in such a conventional LC filter, an attenuation pole that is formed at a frequency higher than the central frequency cannot be moved freely. Thus, the attenuation pole cannot be set near the central frequency.

SUMMARY OF THE INVENTION

In order to overcome the problems described above, preferred embodiments of the present invention provide a multilayer LC composite component that is arranged to allow for free and easy setting of an attenuation pole formed at a frequency higher than the central frequency. Also, preferred embodiments of the present invention provide a method for adjusting the frequency characteristics of the multilayer LC composite component.

According to a first preferred embodiment of the present invention, a multilayer composite component includes a plurality of insulation layers that are stacked to define a multilayered body, a plurality of inductors including via-holes connected in the direction in which the insulation layers are stacked, a plurality of capacitors including capacitor patterns, the inductors and the capacitors being arranged in the multilayered body to define a plurality of LC resonators, and one end of each of the inductors being electrically connected to the capacitor patterns of each of the capacitors defining the LC resonators, a ground pattern arranged one of the insulation layers to be electrically connected to the other ends of the inductors, and an input lead pattern and an output lead pattern arranged on one of the insulation layers to be electrically connected to midpoints of the inductors in the direction in which the insulation layers are stacked.

According to a second preferred embodiment of the present invention, a multilayer LC composite component includes a plurality of insulation layers including at least first to fifth layers arranged to define a multilayered body, a plurality of inductors and a plurality of capacitors disposed in the multilayered body to define a plurality of LC resonators, ground-side capacitor patterns arranged on the first insulation layer, hot-side capacitor patterns arranged on the second insulation layer to define the capacitors of the LC resonators, the hot-side capacitor patterns being opposed to the ground-side capacitor patterns, input and output lead patterns arranged on the third insulation layer, first inductor-via-holes formed in the third insulation layer and connected to the input and output lead patterns, second inductor-via-holes formed in the fourth insulation layer, and a ground pattern arranged on the fifth insulation layer, wherein the first to fifth insulation layers are stacked and then the first and second inductor via-holes are connected in the direction in which the insulation layers are stacked to define the inductors, one end of each inductor being electrically connected to the hot-side capacitor patterns of each of the capacitors defining the LC resonators and the other ends of the inductors being electrically connected to the ground pattern arranged on the fifth insulation layer, and the input and output lead patterns arranged on the third insulation layer being electrically connected to midpoints of the inductors in the direction in which the insulation layers are stacked.

In addition, preferably, a distance between the ground pattern and each of positions connecting the input and output lead patterns to the inductors is within a range of between about 200 μm and about 700 μm in the direction in which the insulation layers are stacked. With this arrangement, desired input and output impedances such as approximately 50Ω, 70Ω, and 75Ω Q can be obtained.

According to a third preferred embodiment of the present invention, a method for adjusting the frequency characteristics of a multilayer LC composite component in which insulation layers are stacked to define a multilayered body inside which a plurality of inductors and a plurality of capacitors are disposed to constitute a plurality of LC resonators, includes the steps of forming the plurality of inductors by forming via-holes connected in the direction in which the insulation layers are stacked, electrically connecting one end of each of the inductors to capacitor patterns of each of the capacitors defining the LC resonators and electrically connecting the other ends of the inductors to a ground pattern arranged on one of the insulation layers, and changing positions at which input and output lead patterns arranged on one of the insulation layers are connected to the inductors in the direction in which the insulation layers are stacked to adjust the frequency characteristics.

In this method, the input and output lead patterns are electrically connected to the midpoints of the inductors in the direction in which the insulation layers are stacked. This arrangement permits an attenuation pole formed at a frequency higher than the central frequency to come close to the central frequency. In other words, by shortening the distance between the ground pattern and each of the positions electrically connecting the input and output lead patterns to the inductors, the inductances of parallel trap circuits are increased, whereby the attenuation pole comes close to the central frequency. As a result, the frequency characteristics of the multilayer LC composite component can be easily and accurately adjusted.

Other features, elements, characteristics, and advantages of the present invention will become more apparent from the following detailed description of the preferred embodiments of the present invention with reference to the attached drawings.

DETAILED DESCRIPTION OF PREFERRED EMBODIMENTS

Now, with reference to the drawings, a description will be provided of preferred embodiments of a multilayer LC composite component and a method for adjusting the frequency characteristics of the LC composite component according to various preferred embodiments of the present invention. In the preferred embodiments, the multilayer LC composite component of the present invention will be described in comparison with the conventional multilayer LC filter 1 shown in FIG. 5.

Figure 1:
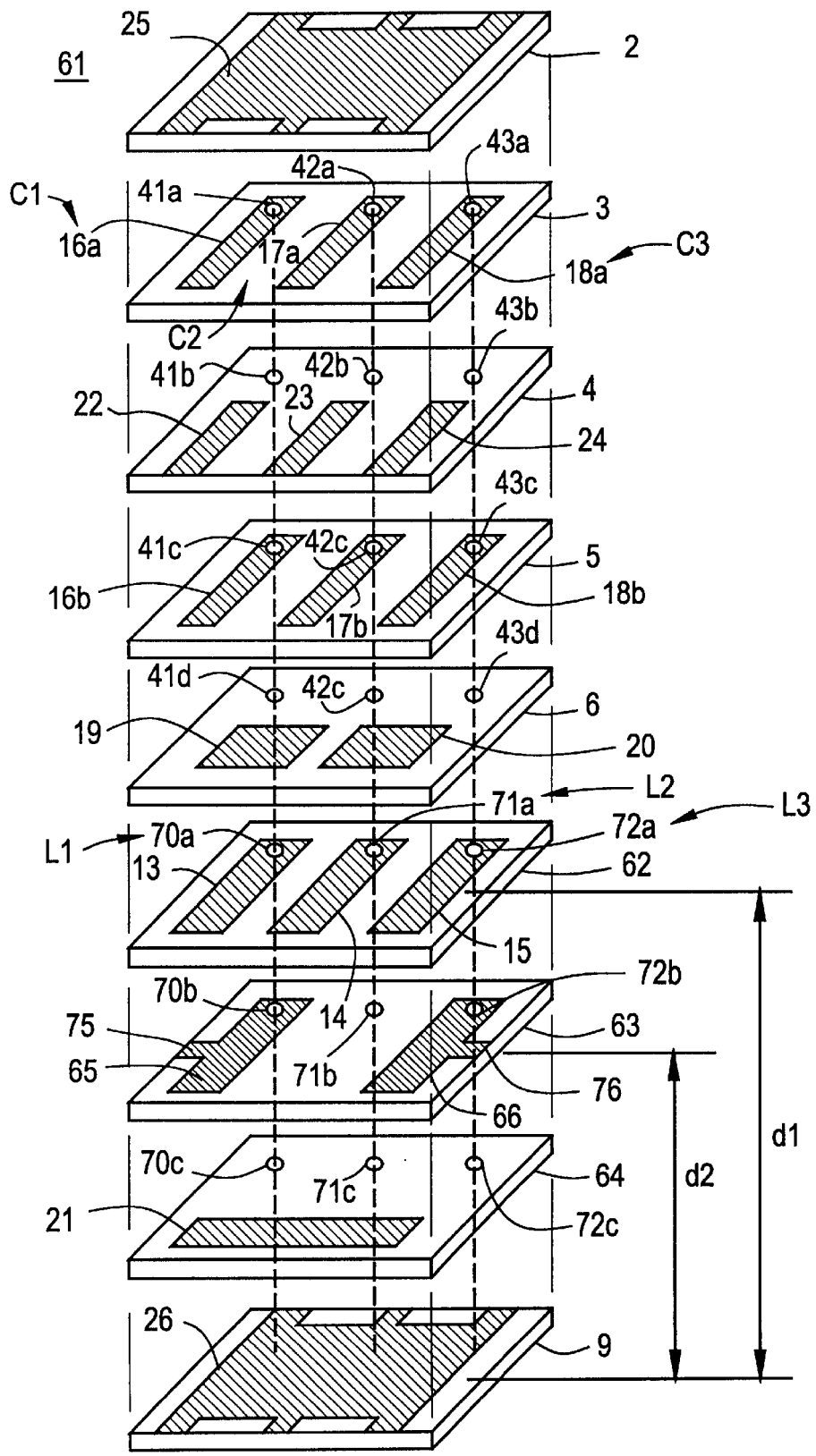
FIG. 1 is an exploded perspective view of a multilayer LC composite component according to a preferred embodiment of the present invention.
Figure 2:
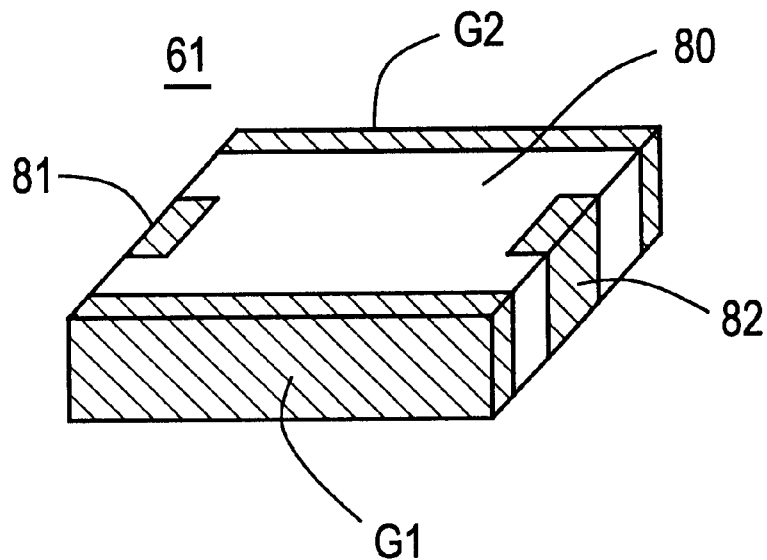
FIG. 2 is an external perspective view of the multilayer LC composite component shown in FIG. 1.
Figure 3:
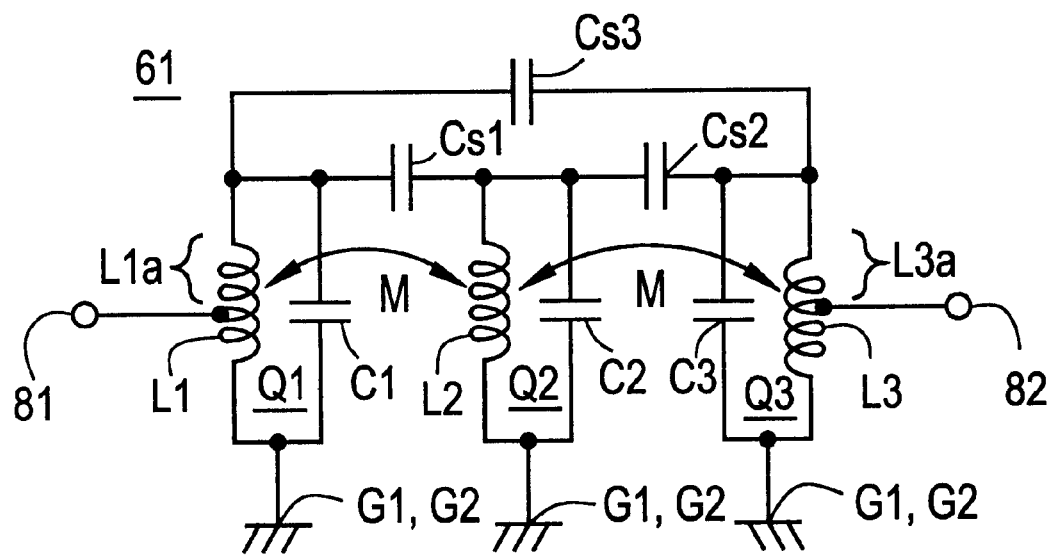
FIG. 3 is an electrically equivalent circuit diagram of the multilayer LC composite component shown in FIG. 2.

FIG. 1 shows the structure of a multilayer LC filter 61. FIG. 2 is an external perspective view of the LC filter 61 and FIG. 3 is an electrically equivalent circuit diagram of the filter 61. The LC filter 61 preferably includes insulation sheets 2 to 6, 9, 62 to 64 having inductor via-holes 70a to 70c, 71a to 71c, and 72a to 72c formed therein, capacitor patterns 13 to 15, resonant hot-side capacitor patterns 16a, 16b, 17a, 17b, 18a, and 18b, coupling capacitor patterns 19 to 21, ground-side capacitor patterns 22 to 24, ground patterns 25 and 26, input and output capacitor patterns 65 and 66, input and output lead patterns 75 and 76 disposed thereon, and other elements.

The insulation sheets 2 to 6, 9, 62 to 64 are preferably made by mixing dielectric ceramic powder or magnetic powder with a binder. The patterns 13 to 26, 65, 66, 75, and 76 are formed of a material such as Ag, Pd, Cu, Ni, Au, or Ag—Pd alloy, and are arranged on the sheets by printing, spattering, or other suitable techniques. The inductor via-holes 70a to 72c and connecting via-holes 41a to 43d are preferably formed by making desirably-shaped holes with a die, a laser, or other suitable tool or process, in the insulation sheets 3 to 6 and 62 to 64 and then filling a conductive material such as Ag, Pd, Cu, or Ag—Pd alloy or other suitable material in the holes.

The inductor via-holes 70a to 70c, 71a to 71c, and 72a to 72c are connected in the direction in which the insulation sheets 62 to 64 are stacked to constitute pillar inductors L1, L2, and L3 having lengths of d1. The axial directions of the inductors L1 to L3 are substantially perpendicular to the surfaces of the sheets 62 to 64. One end of each of the inductors L1 to L3, that is, the via-holes 70c, 71c, and 72c are connected to the ground pattern 26. The ground patterns 25 and 26 are exposed on the front and back surfaces of the sheets 2 and 9.

The resonant capacitor patterns 16a, 16b, 17a, 17c, 18a, and 18b are opposed to the ground pattern 25 and the ground-side capacitor patterns 22, 23, and 24 via the insulation sheets 2, 3, and 4 therebetween to constitute resonant capacitors C1, C2, and C3. The resonant capacitor patterns 16a and 16b are connected to the end of the inductor L1 (via-hole 70a) via the connecting via-holes 41a to 41d to constitute an LC resonator Q1 including the inductor L1 and the capacitor C1. The resonant capacitor patterns 17a and 17b are connected to the end of the inductor L2 (via-hole 71a) via the connecting via-holes 42a to 42d to constitute an LC resonator Q2 including the inductor L2 and the capacitor C2. The resonant capacitor patterns 18a and 18b are connected to the end of the inductor L3 (via-hole 72a) via the connecting via-holes 43a to 43d to constitute an LC resonator Q3 including the inductor L3 and the capacitor C3.

The capacitor patterns 13 to 15 disposed on the insulation sheet 62 extend substantially parallel to a direction from the front edge of the sheet 62 to the back edge thereof. The capacitor patterns 13, 14, and 15 are directly connected to the via-holes 70a, 71a, and 72a defining the inductors L1, L2, and L3.

The capacitor patterns 13 and 14 are opposed to the coupling capacitor pattern 19 via the sheet 6 to define a coupling capacitor Cs1 coupling the LC resonators Q1 and Q2. The capacitor patterns 14 and 15 are opposed to the coupling capacitor pattern 20 via the sheet 6 to define a coupling capacitor Cs2 coupling the LC resonators Q2 and Q3.

The input and output capacitor patterns 65 and 66 provided on the insulation sheet 63 extend substantially parallel to the direction from the front edge of the sheet 63 to the back edge thereof. The input and output capacitor patterns 65 and 66 are directly connected to the via-holes 70b and 72b defining the inductors L1 and L3. Furthermore, the input and output capacitor patterns 65 and 66 are connected to the input and output lead patterns 75 and 76. The input lead pattern 75 is exposed on the left edge of the sheet 63 and the output lead pattern 76 is exposed on the right edge thereof.

The coupling capacitor pattern 21 is opposed to the input capacitor pattern 65 and the output capacitor pattern 66 via the sheet 63 to define a coupling capacitor Cs3 coupling the input-side LC resonator Q1 and the output-side LC resonator Q3.

As shown in FIG. 1, the sheets 2 to 6, 9, and 62 to 64 provided in the above arrangements are stacked sequentially and integrally burned to constitute a multilayered body 80, having the approximate dimensions of, for example, 3.2 mm long, 2.5 mm wide, and 1.4 mm thick, as shown in FIG. 2. An input terminal 81 and an output terminal 82 are disposed on the right and left end surfaces of the multilayered body 80. Ground terminals G1 and G2 are provided on the front and back surfaces of the multilayered body 80. The input terminal 81 is connected to the input lead pattern 75 and the output terminal 82 is connected to the output lead pattern 76. The ground terminals G1 and G2 are connected to the ground patterns 25 and 26 and the ground-side capacitors 22 to 24.

FIG. 3 is an electrically equivalent circuit diagram of the multilayer LC filter 61 constructed according to the above-described arrangement. The resonators Q1 to Q3 are electrically connected to each other via the coupling capacitors Cs1 to Cs3 to constitute a three-stage Chebyshev filter. The first ends of the inductors L1 to L3, that is, via-holes 70a to 72a are connected to the first ends of the capacitors C1 to C3. The second ends of the inductors L1 to L3, that is, the via-holes 70c to 72c are electrically connected to the ground pattern 26.

In the axial directions of the inductors L1 and L3, the input lead patterns 75 and 76 are electrically connected to midpoints of the inductors L1 and L3. Specifically, a distance d2 (See FIG. 1) between the ground pattern 26 and each of the points electrically connecting the input and output lead patterns 75 and 76 to the inductors L1 and L3 is shorter than the length d1 of each of the inductors L1 and L3. With this arrangement, inductances generated by portions L1a and L3a (See FIG. 3) of the inductors L1 and L3 are added to parallel traps defined by mutual inductances M generated between the inductors L1 to L3 and the coupling capacitors Cs1 to Cs3. As a result, an attenuation pole formed at a frequency higher than the central frequency comes close to the central frequency.

In this situation, considering impedance matching, preferably, the ratio between d2 and d1 is preferably in an approximate range of $0.19 \leq d2/d1 < 1$. For example, when d1=776 $\mu$m, d2 is preferably about 150 $\mu$m or more, in which the ratio of 150/776 is equal to approximately 0.193.

Figure 4:
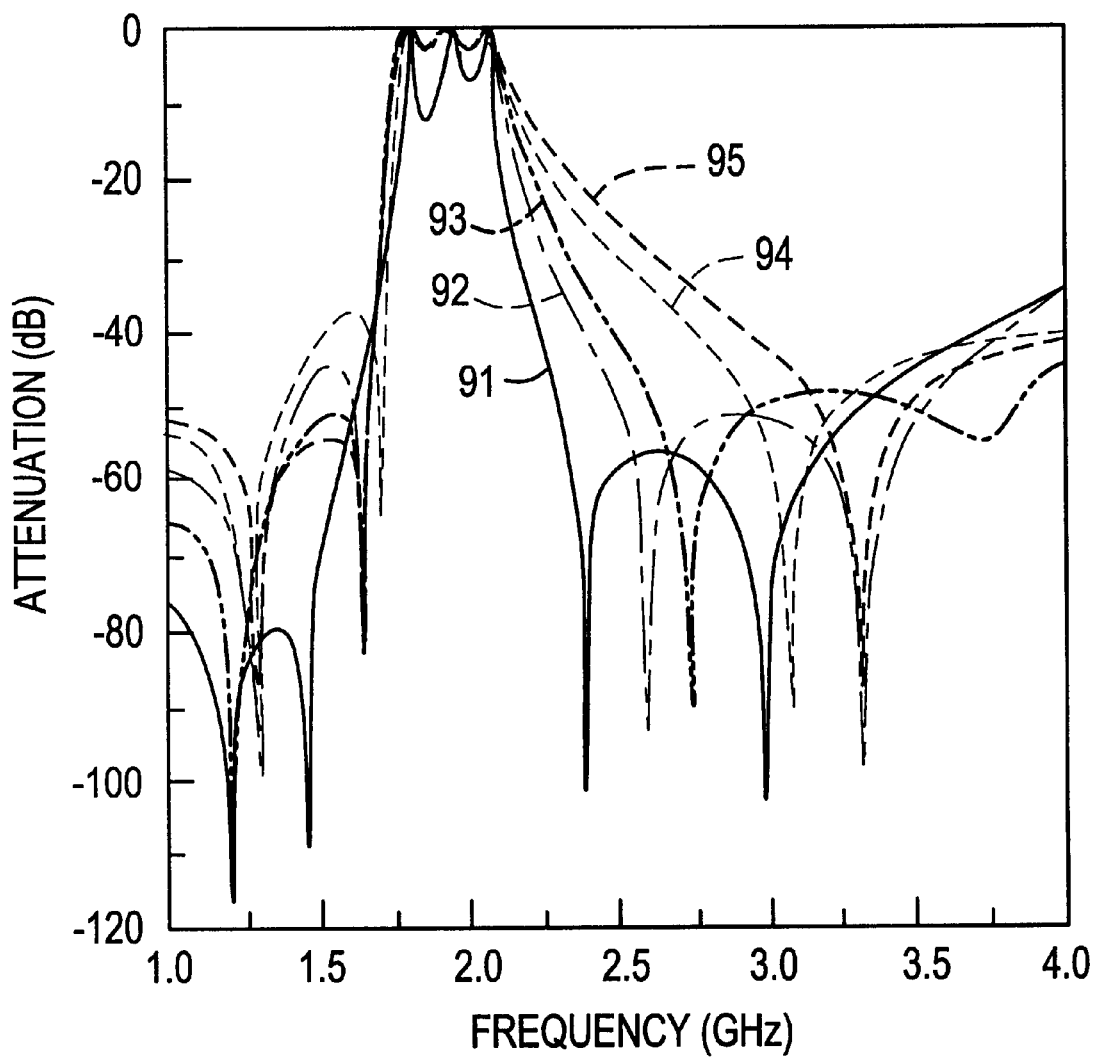
FIG. 4 is a graph illustrating the frequency characteristics of the multilayer LC composite component shown in FIG. 2.
Figure 5:
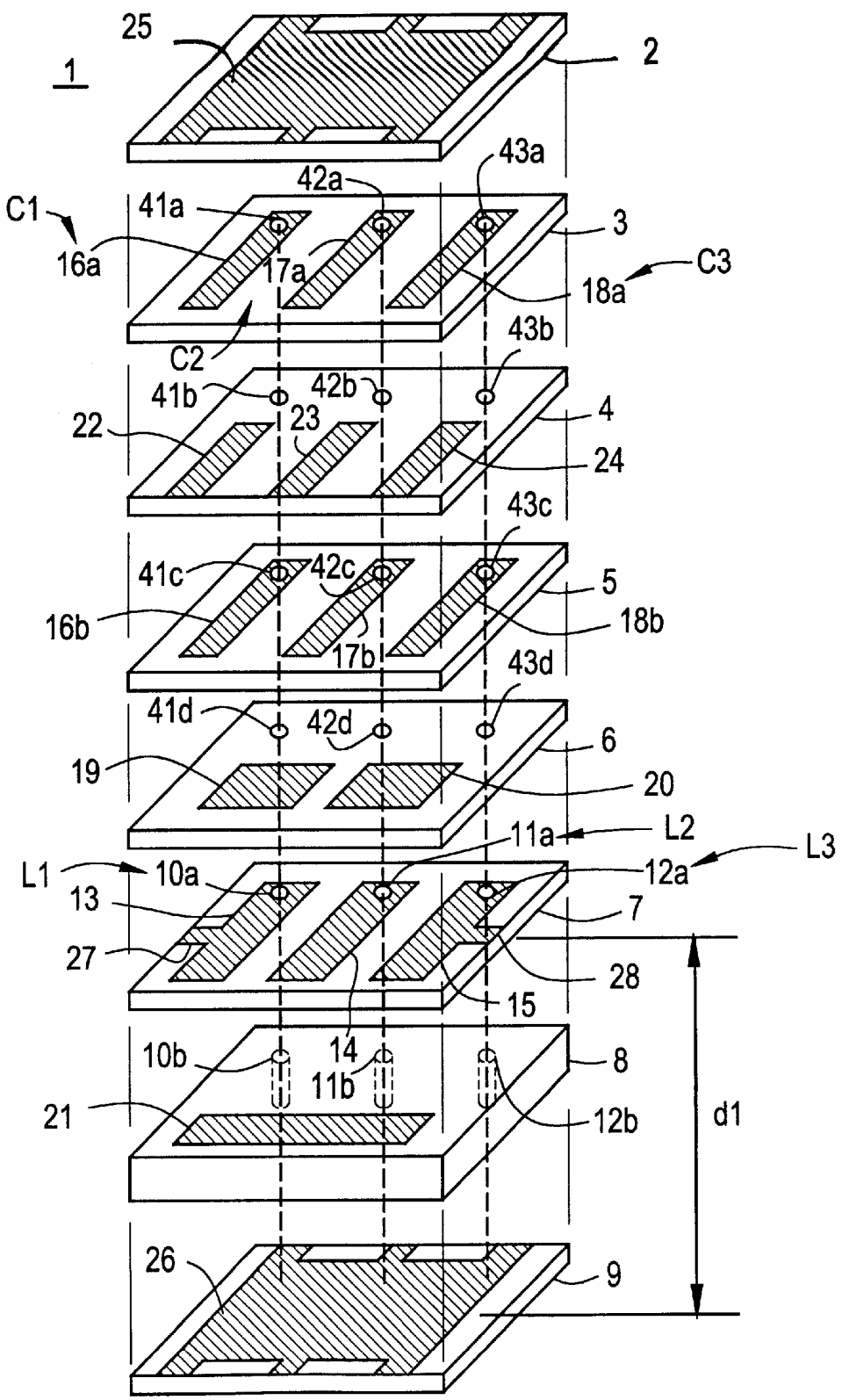
FIG. 5 is an exploded perspective view of a conventional multilayer LC composite component.
Figure 6:
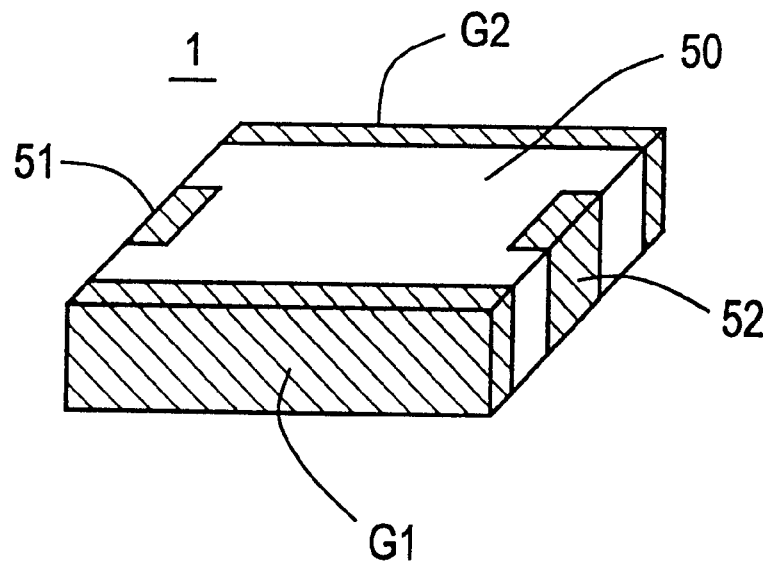
FIG. 6 is an external perspective view of the conventional multilayer LC composite component shown in FIG. 5.
Figure 7:
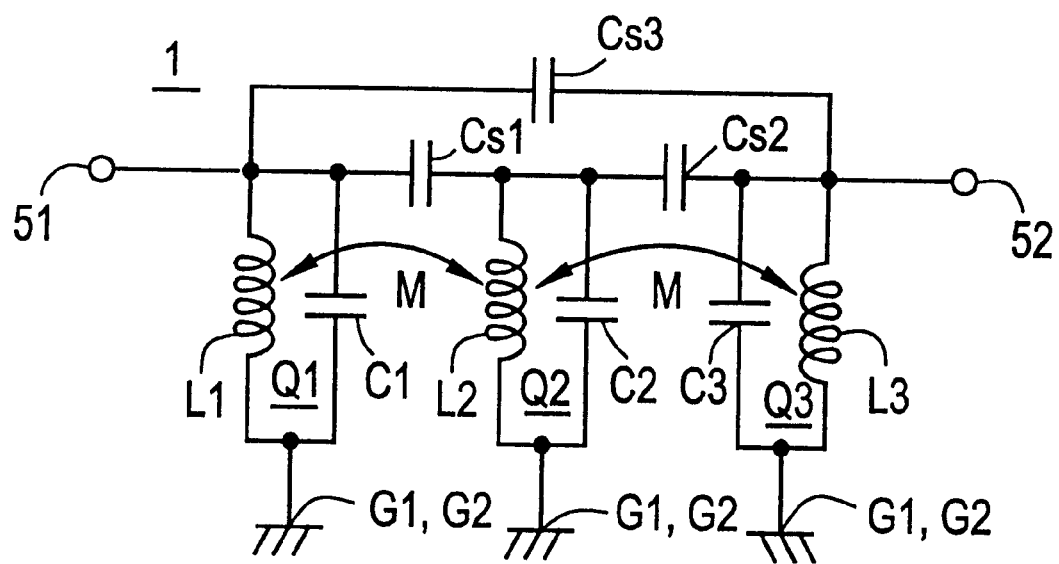
FIG. 7 is an electrically equivalent circuit diagram of the conventional multilayer LC composite component shown in FIG. 6.

In this manner, in the multilayer LC filter 61, the attenuation pole formed at a frequency higher than the central frequency can be easily and accurately adjusted. FIG. 4 graphically illustrates frequency characteristics adjusted by changing the distance d2 in the multilayer LC filter 61 including inductors L1 to L3 having lengths d1 of about 776 $\mu$m and diameters of about 0.2 mm. Solid line 91 shows characteristics obtained when d2=200 $\mu$m. Dash-single-dot line 92 shows characteristics obtained when d2=400 $\mu$m, and dash-double-dot line 93 shows characteristics obtained when d2=500 $\mu$m. Dotted line 94 shows characteristics obtained when d2=700 $\mu$m. For comparison, the characteristics of the conventional LC filter 1 shown in FIG. 5 are also presented by solid line 95. As shown in FIG. 4, obviously, as the distance d2 becomes shorter, the attenuation pole formed at a frequency higher than the central frequency comes closer to the central frequency.

When the LC filter 61 is used as a broad band filter, d1 and d2 need to be as close to each other as possible. In other words, the ratio between d1 and d2 needs to be close to 1 as possible. On the other hand, when the filter 61 is used as a narrow band filter, the difference between d1 and d2 needs to be as great as possible. More specifically, d2 needs to be close to 0 as possible.

The multilayer LC composite component and the method for adjusting the frequency characteristics of the LC composite component of the present invention are not restricted to the above-described preferred embodiments. Various modification and changes can be made without departing the scope of the present invention.

As the LC composite component, for example, there is provided a band pass filter, a low pass filter, a high pass filter or other suitable filter. Alternatively, there may be used a duplexer defined by combining band pass filters, a duplexer defined by combining low pass filters, high pass filters, or trap circuits. Furthermore, the LC composite component of the present invention may be a duplexer constructed by combining these different kinds of circuits. Other than a duplexer, as the LC composite component of the present invention, there may be provided a triplexer, a multiplexer, or other suitable device, in which a plurality of filters is arranged in a single multilayered body.

In preferred embodiments described above, after stacking the insulation sheets having the conductive patterns and the via-holes, the insulation sheets are integrally burned. However, the present invention is not restricted to this process. The insulation sheets may be burned in advance.

Alternatively, the LC composite component may be produced in the following manner. After forming an insulation layer with an insulation paste by printing or other suitable process, a conductive paste is applied on the insulation layer to define conductive patterns and via-holes. Next, an insulation paste is applied on the structure to form another insulation layer. Similarly, by sequentially applying the insulation paste, an LC composite component having a multilayer structure can be obtained.

As previously described, in the multilayer LC composite component of preferred embodiments of the present invention, the input and output lead patterns are electrically connected to midpoints of the inductors in the direction in which the insulation sheets are stacked. With this arrangement, an attenuation pole formed at a frequency higher than the central frequency can be moved to be close to the central frequency. As a result, the frequency characteristics of the multilayer LC composite component can be adjusted easily and accurately.

While the present invention has been particularly shown and described with reference to preferred embodiments thereof, it will be understood by those skilled in the art that the foregoing and other changes in form and details can be made without departing from the spirit and scope of the present invention.

What is claimed is:

1. A multilayer LC composite component comprising:
   a plurality of insulation layers stacked to define a multilayered body;
   a plurality of inductors having first and second ends and including via-holes extending through the plurality of insulation layers and connected in the direction in which the insulation layers are stacked;
   a plurality of capacitors including capacitor patterns, the inductors and the capacitors being arranged in the multilayered body to define a plurality of LC resonators, and the first end of each of the inductors being electrically connected to the capacitor patterns of each of the capacitors defining the LC resonators;
   a ground pattern arranged on one of the insulation layers to be electrically connected to the second ends of the inductors; and
   an input lead pattern and an output lead pattern arranged on one of the insulation layers to be electrically connected to midpoints of the inductors in the direction in which the insulation layers are stacked.

2. A multilayer LC composite component according to claim 1, wherein a distance between the ground pattern and each of positions connecting the input and output lead patterns to the inductors is within a range of about 200 $\mu$m and about 700 $\mu$m in the direction in which the insulation layers are stacked.

3. A multilayer LC composite component according to claim 1, wherein the via holes of the plurality of inductors are arranged to define pillar inductors.

4. A multilayer LC composite component according to claim 1, wherein the capacitor patterns are resonant capacitor patterns that are opposed to the ground pattern and to ground-side capacitor patterns via selected ones of the plurality of insulation sheets disposed therebetween to constitute resonant capacitors.

5. A multilayer LC composite component according to claim 1, wherein the capacitor patterns are disposed on one of the plurality of insulation sheets and extend substantially parallel to a direction from the front edge of the one of the plurality of insulation sheets to the back edge thereof.

6. A multilayer LC composite component according to claim 1, wherein the capacitor patterns are directly connected to the via-holes defining the inductors.

7. A multilayer LC composite component according to claim 1, wherein the capacitor patterns are opposed to a coupling capacitor pattern via one of the plurality of insulation sheets to define a coupling capacitor that couples at least two of the LC resonators together.

8. A multilayer LC composite component according to claim 1, further comprising coupling capacitors, wherein the LC resonators are electrically connected to each other via the coupling capacitors to constitute a three-stage Chebyshev filter.

9. A multilayer LC composite component according to claim 8, wherein the first ends of the inductors are connected to first ends of the coupling capacitors, and second ends of the inductors are electrically connected to the ground pattern.

10. A multilayer LC composite component according to claim 1, wherein a distance between the ground pattern and each of the points electrically connecting the input and output lead patterns to the inductors is shorter than the length d1 of each of the inductors.

11. A multilayer LC composite component according to claim 10, wherein a ratio between d2 and d1 is preferably in an approximate range of $0.19 \leq d2/d1 < 1$.

12. A multilayer LC composite component according to claim 1, wherein the multilayer LC composite component is one of a band pass filter, a low pass filter, a high pass filter, a duplexer, a triplexer, and a multiplexer.

13. A multi-layer LC composite component comprising:
    a plurality of insulation layers including at least first to fifth layers arranged to define a multilayered body;
    a plurality of inductors and a plurality of capacitors disposed in the multilayered body to define a plurality of LC resonators;
    ground-side capacitor patterns arranged on the first insulation layer;
    hot-side capacitor patterns arranged on the second insulation layer to define the capacitors of the LC resonators, the hot-side capacitor patterns being opposed to the ground-side capacitor patterns;
    input and output lead patterns arranged on the third insulation layer;
    first inductor-via-holes provided in the third insulation layer and connected to the input and output lead patterns;
    second inductor-via-holes provided in the fourth insulation layer; and
    a ground pattern arranged on the fifth insulation layer;
    wherein the first to fifth insulation layers are stacked and then the first and second inductor via-holes are connected in the direction in which the insulation layers are stacked to define the inductors, a first end of each of the inductors that is electrically connected to the hot-side capacitor patterns of each of the capacitors defining the LC resonators and a second end of each of the inductors that is electrically connected to the ground pattern arranged on the fifth insulation layer, and the input and output lead patterns arranged on the third insulation layer being electrically connected to midpoints of the inductors in the direction in which the insulation layers are stacked.

14. A multilayer LC composite component according to claim 13, wherein a distance between the ground pattern and each of positions connecting the input and output lead patterns to the inductors is within a range of about 200 $\mu$m and about 700 $\mu$m in the direction in which the insulation layers are stacked.

15. A multilayer LC composite component according to claim 13, wherein the inductors include via holes which are arranged to define pillar inductors.

16. A multilayer LC composite component according to claim 15, wherein the capacitors include capacitor patterns that are directly connected to the via-holes defining the inductors.

17. A multilayer LC composite component according to claim 16, wherein the capacitor patterns are opposed to a coupling capacitor pattern via one of the plurality of insulation sheets to define a coupling capacitor that couples at least two of the LC resonators together.

18. A multilayer LC composite component according to claim 13, further comprising coupling capacitors, wherein the LC resonators are electrically connected to each other via the coupling capacitors to constitute a three-stage Chebyshev filter.

19. A multilayer LC composite component according to claim 13, wherein the multilayer LC composite component is one of a band pass filter, a low pass filter, a high pass filter, a duplexer, a triplexer, and a multiplexer.

* * * * *